United States Patent [19]

Newhard

[11] Patent Number: 5,124,032
[45] Date of Patent: Jun. 23, 1992

[54] SWIMMING POOL CHLORINATOR

[76] Inventor: Harry W. Newhard, 2 Pebble Creek Rd., St. Louis, Mo. 63124

[21] Appl. No.: 772,946

[22] Filed: Oct. 8, 1991

[51] Int. Cl.[5] ............................................. E04H 3/16
[52] U.S. Cl. .................................... 210/169; 210/202; 210/206
[58] Field of Search .................... 210/206, 202, 169; 422/263, 264, 265, 266, 275, 277, 279

[56] References Cited

U.S. PATENT DOCUMENTS

| | | |
|---|---|---|
| 3,899,425 | 8/1975 | Lewis .................. 210/206 |
| 4,040,962 | 8/1977 | Hanford ............... 210/206 |
| 4,317,733 | 1/1982 | Xhonneux ............ 210/206 |
| 4,338,191 | 7/1982 | Jordan ................. 210/206 |
| 4,363,728 | 12/1981 | Guglielmi et al. ... 210/206 |
| 4,584,106 | 4/1986 | Held ..................... 210/754 |
| 4,780,197 | 10/1988 | Schuman .............. 210/206 |

Primary Examiner—Stanley S. Silverman
Assistant Examiner—Cynthia L. Nessler
Attorney, Agent, or Firm—Kalish & Gilster

[57] ABSTRACT

Chemical treatment device, i.e., a chlorinator for use in a swimming pool filtration and circulation system having a skimmer system with a water intake from the pool, a filter for receiving and filtering water intaken, and a pump for returning filtered water to the pool. The device has a vessel of synthetic material with a compartment for treatment chemical, and is provided with an array of break-opens at different levels for opening through from exteriorly of the vessel into the compartment. The device includes an arrangement for locating the vessel to receive flow of water entering the skimmer causing flow to be exposed to the chemical for dissolving it. Interior walls of the compartment diverge downwardly to prevent bridging of the chemical within the compartment. The compartment has a drain for discharging treated water into the skimmer system. Discharging may also take place through the break-opens.

15 Claims, 2 Drawing Sheets

SWIMMING POOL CHLORINATOR

BACKGROUND

This invention relates to chemical treatment of liquid in circulating systems and, more particularly, to an improved water treatment device, specifically a chlorinator, for use with swimming pool filtration and circulation systems.

In the chlorination of swimming pool water, it is known to provide either addition of fixed quantities of chlorine-producing chemicals directly to swimming pool water, as by directly pouring the liquid or dry materials to the water, or to use devices for time-release discharge of such chemicals.

Time-discharge release has been carried out by using either floating devices or chemical feeders wherein water is caused to flow through a containment of chemical to be dissolved. Such floating devices permit chlorine-releasing substance to leach from a container into water surrounding the device. These floating devices, sometime facetiously called "Rubber Duck" devices, may be objectional to users because an undesirable "cloud" of undispersed released chemical surrounds the device as it floats.

In use of such chemical feeders, a known type of device has a container through which water pumped by a swimming pool filtration and circulation system for purposes of dissolving treatment chemical in the container.

Chlorination chemicals or other chemical compositions for treatment of swimming pool water, such as calcium hypochlorite and various other chemicals are available in the form of a concentrated cake, pellet or tablet wherein the active ingredients are held by a matrix of inert materials. The matrix breaks down when exposed to water, causing dissolution and entrainment of the substance held in a container.

Heretofore, it has been the practice to locate such devices on the pump discharge side of the circulation system, i.e., in a location within the circulation system such that water will flow from the pump outlet, as by means of a bypass, through the container, for flow into the stream of water delivered to the pool. In some types of installations, water exposed to the chemical will not pass through the pool filter, so that particulate matter resulting from dissolution of the matrix containing the active chemical may produce particles which flow back into the pool. There, they may constitute an objectionable source of contamination, producing cloudiness or eventually settling to the bottom of the pool from which they must be vacuumed or once again drawn into the pool circulation inlet for ultimate filtration.

Although it may be known alternatively to connect conventional chemical containers in a flow path by which the water with entrained treatment chemical necessarily will flow through the pool filter, such chemical containers and their associated plumbing are specialized items which require installation involving cutting, splicing and connection of various pump flow lines to and from the chemical feeder. Therefore, such prior art chemical feeders are to a degree objectionably expensive or cumbersome as well as time-consuming to install and service.

SUMMARY OF THE INVENTION

Accordingly, among the several objects of the invention may be noted the provision of an improved chemical treatment device for use with liquid circulations systems, namely a swimming pool water treatment device in the form of a chlorinator for use in a swimming pool filtration and circulation system; which does not require any plumbing, cutting of lines, installation of lines, or other elaborate steps for adapting it to use with an existing pool filtration and circulation system; which accordingly may be easily integrated into existing systems; which is inexpensively installed and serviced; which permits the constant exposure of chlorination or other pool treatment chemical substances to the flow of water in such a filtration and circulation system; which precludes the possibility of a chemical matrix or other inert chemicals from being discharged directly into pool water without filtration; which provides for relatively precise control of selective chemical release rate over a wide range of possible release rates to achieve a preselected concentration; which as a chlorinator assures of precise, reliable and uniform chlorination, as well as precisely repeatable results from one unit to the next; which permits easy monitoring of the amount of chemicals in the chlorinator; which permits ready replacement of the chemicals in the chlorinator when they are depleted or used up; which provides predetermined and easy contact of the amount of chemical, such as chlorine-releasing chemical, discharged per unit time, as well as allowing such change rate to be readily changed for different size pools or conditions; which ensures of reliable dissolution of chemical pellets without problems caused by bridging in the device; which uses modular components for facilitating usage and replenishment of chemical substances to be released into swimming pool water by the pool filtration and circulation system; and which is not only highly reliable but extremely economical.

Briefly, a chemical treatment device or chlorinator of the present invention is used in a swimming pool filtration and circulation system. More specifically, it is intended for use with a swimming pool having a water intake from the pool, such system including a filter for receiving and filtering water intaken by the intake and which includes a pump for returning filtered water from the filter to the pool. The device, or chlorinator as used for releasing chlorination or other chemical substances into the water, includes a changeable vessel for containing a quantity of chemical to be released into the water. The vessel has a plurality of break-opens, each located at a position located along the vessel's outer surface. These break-opens permit selective breaking-open to provide a preselected number of openings, each opening through the break-open from exteriorly of the vessel into the chemical contained therein. Means uniquely cooperative with the vessel positions it removably within the flow of water into the water intake, and in a position for permitting the flow of water to enter each opening so provided for exposure to the water of the chemical for entraining of such chemical, and whereby water in which such chemical is entrained is filtered before being returned to the pool.

Other objects and features will be in part apparent and in part pointed out hereinbelow.

BRIEF DESCRIPTION OF THE DRAWINGS

Corresponding reference characters indicate corresponding use throughout the several views of the drawings.

DESCRIPTION OF THE PREFERRED EMBODIMENTS

Figure 1:
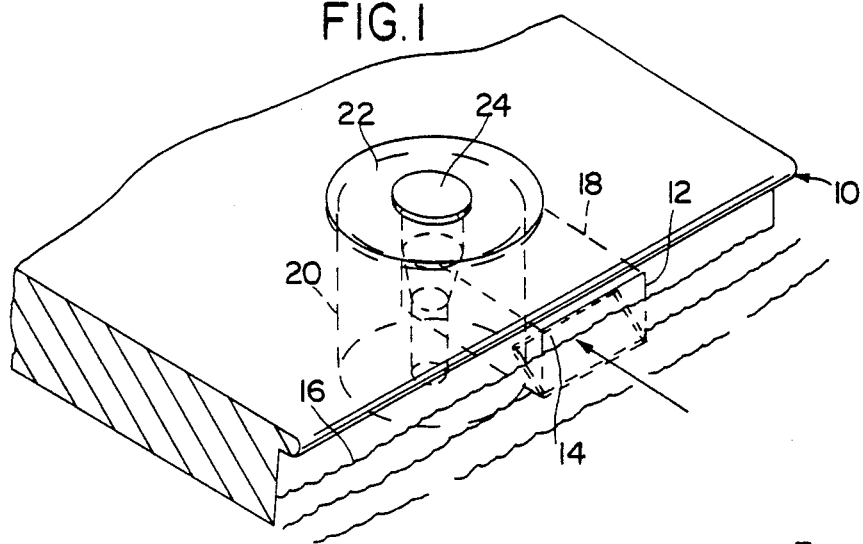
FIG. 1 is a perspective view of portions of a swimming pool filtration and circulation system wherein a chemical treatment device, or chlorinator, of the present invention is installed in a skimmer of such system.

Referring now by reference characters to the drawings, there are shown in FIG. 1 portions of a swimming pool filtration and circulation system of a conventional in-ground swimming pool designated generally 10 including a skimmer opening 12 which includes a swingable flap or skimmer or door 14 into which the pool of water 16 may flow into the skimmer to be filtered. Such a skimmer includes a rectangular chamber 18 which communicates with a cylindrical skimmer basket chamber 20 including a skimmer basket 21 (FIG. 6) for trapping debris). Chamber 20 is fitted with a conventional cover 22 into an opening of which the new chemical treatment device A (FIG. 2), is fitted so that only its flanged top 24 is visible. Such device A is hereinafter referred to as a chlorinator.

Figure 2:
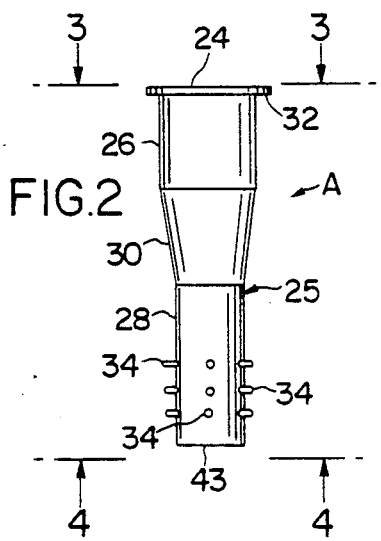
FIG. 2 is a side elevation view of such a device of the invention.

Referring to FIG. 2, chlorinator A includes a tubular vessel generally designated 25 having a tubular upper securement portion 26, a tubular lower portion or vertical extent 28, and a tapered tubular intermediate portion 30 which decreases linearly in width or diameter from the constant diameter upper portion 26 to the constant width or diameter lower portion 28. The top 24 includes a radial flange 32 of slightly greater lateral extent than upper portion 26. Top 24 of circular shape 24 like vessel 25 closes the upper end of chlorinator A, whereas the lower end 28 is provided with a plurality of tubular radial projections, i.e., extensions, 34 which constitute break-opens. These break-opens may be cut or broken off in the manner shown in FIG. 7 so that when detached, as shown at 34', the break-open will leave at its base 36 a corresponding opening 38 into the interior 40 of the chlorinator.

Figure 4:
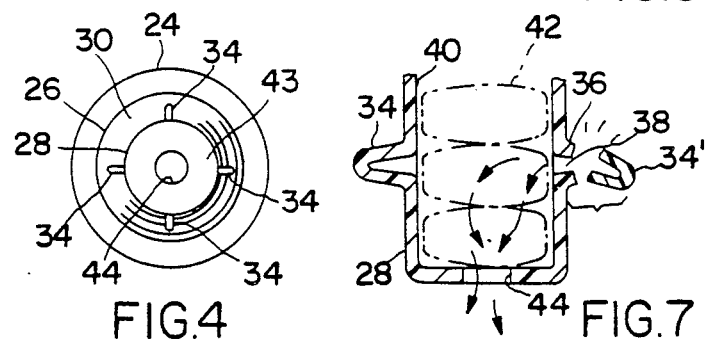
FIG. 4 is a bottom elevation view, as taken along line 4—4 of FIG. 2.
Figure 7:
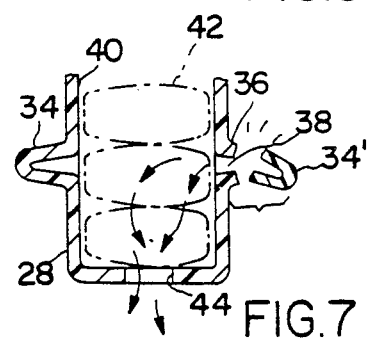
FIG. 7 is a vertical cross-section of a lower portion of the device of FIG. 2, illustrating certain break-opens and their use to provide openings into the device.

The interior of chlorinator A contains a number of pellets 42 of a chlorine-releasing (or other chemical-releasing) substance in a conventional matrix capable of being dissolved by water which may enter through openings as that designated 38. Referring still to FIGS. 4 and 7, lower portion 28 is provided with a bottom 43 having a central opening 44 of sufficient size and extent to permit water within chlorinator A to drain from it. Indeed, more than one such opening 44 may be provided as shown at 44' in FIG. 8; but the shape of such openings is not a matter of present significance.

The break-opens 34 are located in groups of four, equally spaced at arcuate intervals (e.g., 90°) in rings around the periphery of the lower portion 28. As shown in FIG. 2, there are three such sets or rings of projections or break-opens at different vertical levels along the surface of lower portion 28 to be selectively broken off for preselecting differing levels of such openings 38 for admitting water flow into vessel 25, and whereby the volumetric rate of water to be admitted will be predetermined in accordance with which of the levels of break-opens 34 and their number have been broken off. The concentration of the dissolved material in a pool may be controlled accordingly by selecting the rate of dissolution of the chemical. Thus, the three levels of break-opens 34 may correspond to pool volumes such as 10,000 g, 20,000 g or 40,000 g; or to different possible pumping rates, and so forth.

Vessel 25 may be formed most preferably by selecting from any of numerous usable synthetic polymers, including thermoplastics. One such material usable for holding chlorine-releasing tablets is polyethylene.

Vessel 25 may be formed as a single unit with its flanged top 24 integrally secured after loading of the vessel interior with a predetermined number of chemical-releasing pellets 42, as by heat-sealing or plastic welding technique, and whereby a marketable, filled device A is formed which can be used until the pellets are exhausted and therefore disposed for safe landfilling or recycling. Vessel 25 may also be filled and closed from the bottom.

Figure 5:
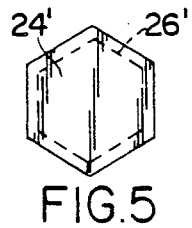
FIG. 5 is a top plan view of a modified embodiment of the device, corresponding to FIG. 3.

Referring to FIG. 5, the circular top 24 of vessel 25 corresponds to the circular section of vessel portion 26, as to be received in an opening 46 of corresponding shape in skimmer lid or cover 22. Alternatively, top 24' and corresponding vessel portion 26' may be polygonal for being received in opening 46, as of corresponding polygonal form, for uniquely keyed corresponding relation. Thus, by selecting appropriate section for vessel 25, it may be designated for specific uses, sizes, lengths or other characteristic (e.g., chemical concentration or type) appropriate to the swimming pool and its circulation and filtration system. In this way, device A will not be replaceable by an improper or incorrectly sized or specified unit.

Figure 6:
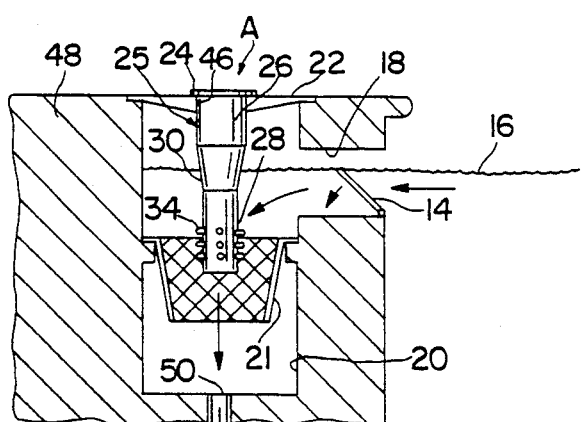
FIG. 6 is a schematic, generalized cross-sectional illustration of portions of a swimming pool filtration and circulation system having a device of the invention.
Figure 3:
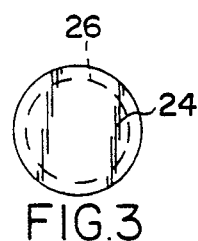
FIG. 3 is a top plan view of the device, as taken along line 3—3 of FIG. 2.

Installation and use of device A are illustrated in FIG. 6, generally showing the relative orientation of the skimmer elements 12-22 for so-called in-ground pool. Such elements typically are enclosed, as by conventional surrounding concrete structure 48 to support skimmer basket 21 appropriately for receiving water skimmed from pool water 16 by skimmer door 14. Skimmer chamber 20 is conventionally drained as shown by an outlet 50 which communicates by conventional pump inlet line 52 for delivery of water intaken by skimmer to the usual pump P. A pump outlet line 54 provides water under pressure to the customery pool circulation system filter 56 from which the filtered water is returned to pool 16. Therefore, it may be understood that pump P produces when operating a continuous flow of water from pool 16 into skimmer chamber 20.

For installation, a known cover 22 is modified or replaced so as to be provided with opening 46 formed of shape, whether polygonal, circular or otherwise, corresponding to the section of device portion 26 (and as readily indicated by the corresponding shape of its top 24). Preferably opening 46 is only slightly larger than the section of vessel portion 26, so that device A is easily inserted and will be held in place by flange 32. In this inserted position as shown, vessel 25 is positioned for receiving flow of water into the skimmer. Vessel 25 will be continually bathed by the skimmer flow when pump P is operating.

Prior to the insertion of device A as just described, the user will break off or cut off the desired number and level of break-opens 34 for providing openings 38 for preselected degree of chemical treatment to achieve dissolution rate control desired according to pool size and conditions. Indicia on the exterior of vessel 25 may indicate the number of openings needed for pools of certain sizes.

As the skimmer water is permitted to enter vessel 25 in this manner, the water flow will be exposed to the chemical pellets 42 (or to other forms of chemical substance in vessel 25) for dissolving and for entraining the chemical, such as of a chlorine-releasing type. Water with the entrained chemical drains through opening 44 to join the flow into pump inlet 52 and for return then to pool 16, but only after passing through filter 56, which traps particles of the matrix holding the chemical dissolved in vessel 25. Discharging may also take place through the break-opens.

Accordingly, the overall length of vessel 25 is selected for exposure of its lower, i.e., exposure, portion 28 for exposure to the skimmer flow, so as to ensure that water enters each opening 38 provided by the break-opens. Flow as shown in FIG. 7 is then assured.

When the material in device A is used up, the vessel or entire device is simply changeable by replacement. Use of transparent or translucent material for vessel 25 permits ready visual inspection of the amount of chemical remaining.

Figure 9:
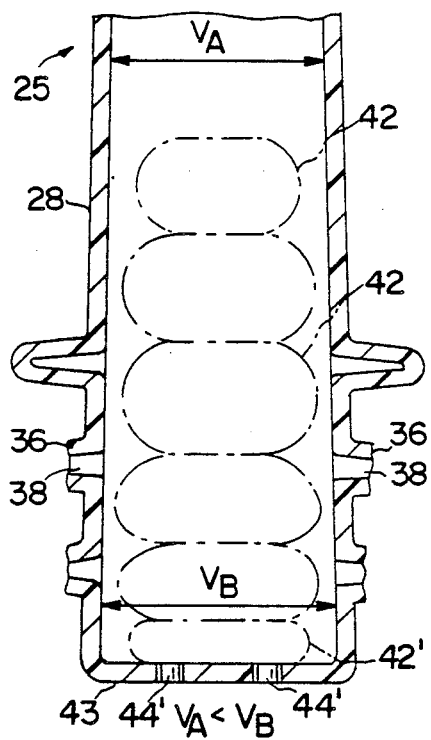
FIG. 9 is a vertical cross-section, similar to FIG. 7, showing, in large detail, features of the new device of the invention.

In the filling of device A, it is preferred to load pellets 42 in a stack, as so shown in FIGS. 7 and 9. As the pellets are exposed to such flow within lower portion 28, the lowermost pellet 42, tends to dissolve. As it does so, it shrinks until eventually it is completely dissolved, and a next pellet takes its place. As the pellets are softened and begin to dissolve, they may tend to bridge against the inner walls of the vessel interior 40. To prevent such bridging, and effectively wedging the stack of pellets 42 (which could prevent the stack from moving to the bottom, and so prevent uniform exposure of the stack to the flow through the openings 38 provided by break-opens) the inside diameter or corresponding dimensions in the compartment within portion 28 provide a reverse taper having an inside diameter or opposed wall spacing $V_A$ and the upper extent of bottom portion 28 which is less than a corresponding such dimension $V_B$ at the lower extent of the compartment portion 28. Because inner walls of portion 28 thus diverge uniformly toward the bottom, the effect of bridging of pellets 44 and wedging the stack is prevented. The stack may then always reliably extend to the floor 43, as shown.

Figure 8:
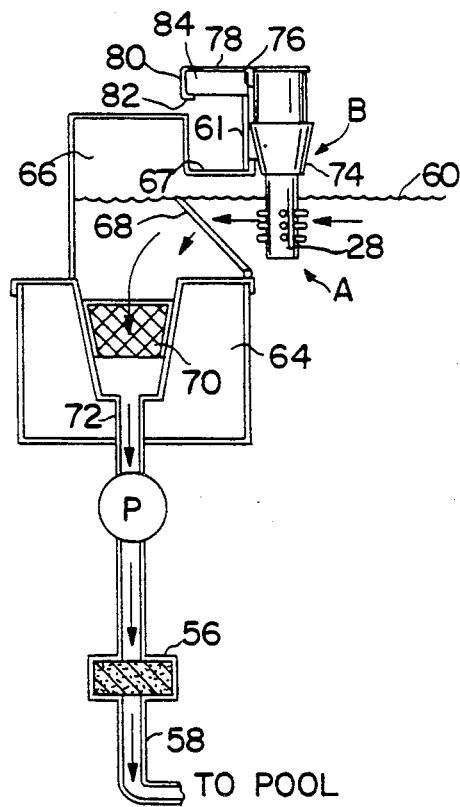
FIG. 8 is a vertical cross-section of portions of a swimming pool filtration and circulation system, as used for above-ground pools, utilizing a device of the invention.

FIG. 8 illustrates a filtration and circulation system for an above-ground pool 60 such as may include upstanding pool wall, as at 61, having a free-standing skimmer unit 62 mounted at or along pool all to define a housing 64 having a skimmer chamber 66 extending above the water level, so that water will be drawn into an intake 67 and skimmed by a skimmer door or flap 68 and then flow into the usual skimmer basket 70 for being collected by a drain 72 connected to the inlet of pump P, to be filtered by filter 56 before being returned to the pool by return line 58. Unit A is installed in the above-ground filtration and circulation system by use of an accessory B.

Accessory B is a holder for positioning unit A by submerging vessel portion 28 within pool 60 at a location proximate door 68 where portion 28 will be exposed to flow of water into the intake. Accessory B includes a funnel-shaped collar 74 for receiving and surroundingly and engagingly conforming to the tapered intermediate portion 30. Collar 74 is supported by a suitable bracket 76 having a horizontal portion 78 with downturned flange 80 and short return 82, thereby to engage a pool wall edge or rail 84 for reliable securement of unit A. Operation is thus very much like that for the system of FIG. 6, with constant flow of water assured for entraining the chemical substance within unit A for treatment of the pool water and assurance of trapping the matrix material for pellets 42 without interference with treatment.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions and methods herein described and illustrate without departing from the scope of the invention, it is intended that all matter contained in the foregoing description or shown in the accompanying drawings shall be interpreted as illustrative rather than limiting.

What is claimed is:

1. For use in a swimming pool filtration and circulation system for a swimming pool, the system having a water intake from the pool, a filter for receiving and filtering water intaken by the intake, and a pump for returning filtered water from the filter to the pool, the improvement comprising a chemical treatment device comprising a vessel with a compartment for containing a quantity of treatment chemical, selective opening means for providing a predetermined number of openings, each opening through from exteriorly of the vessel into the compartment and chemical contained therein, means for positioning the vessel to receive flow of water for causing the flow to enter such opening to cause water of the flow to be exposed to the chemical for dissolving and entraining it for treatment of the water, and means for discharging treated water from the compartment; wherein the selective opening means comprise a plurality of break-opens, each of said break-opens being an extension of the compartment and each providing means for being selectively opened by breaking each said extension for providing a corresponding one of said openings.

2. Device according to claim 1 wherein the compartment is formed of synthetic material, 3. Device according to claim 1 wherein the compartment includes a vertical extent defined by upright interior walls of the vessel, the wall spacing diverging toward a lower end of the compartment to prevent bridging of the chemical within the compartment as the chemical is dissolved.

4. Device according to claim 1 wherein the vessel is of a configuration for exposure to flow of water to be skimmed by the water intake, and the compartment includes a vertical extent to receive such exposure, said vertical extent having said break-opens at different levels along said vertical extent to permit selective openings at such different levels whereby to control the amount of water entering the compartment for determining the rate of dissolving the chemical.

5. Device according to claim 4 wherein the break-opens are arranged in multiple groups, each group being at a different level along said vertical extent.

6. Device according to claim 5 wherein the compartment is of generally cylindrical form, the break-opens of each group being arcuately spaced in a ring around the cylindrical form compartment, there being plural such rings evenly spaced along said vertical extent of the compartment.

7. Device according to claim 1 wherein the vessel includes at least a securement portion and an exposure portion defining the compartment, the securement portion being above the exposure portion.

8. Device according to claim 7 wherein the vessel is vertically elongated and is comprised of a closed upper portion, and a lower portion having at least one drain opening therein, providing said discharging means.

9. Device according to claim 8 wherein the system includes a skimmer, and the upper portion is flanged for engagement with a skimmer cover of the system for so positioning the vessel within a skimmer compartment of the system.

10. Device according to claim 9 wherein the skimmer cover is provided with a vessel opening for receiving the vessel, and the vessel opening and vessel upper portion are of complementary geometry for corresponding keyed engagement.

11. Device according to claim 10 wherein the vessel opening and vessel upper portion are circular in section.

12. Device according to claim 10 wherein the vessel opening and vessel upper portion are polygonal in section.

13. Device according to claim 9 wherein the vessel includes an intermediate portion located between the upper portion and the lower portion, the upper, intermediate and lower portions being each tubular and each successively smaller in width along a vertical extent of the vessel.

14. Device according to claim 13 wherein the intermediate portion is tapered, said means for positioning the vessel comprising a holder having a first member for surroundingly engaging the intermediate portion and a second member for engaging a swimming pool structure for so positioning the vessel by location proximate the water intake.

15. For use in a swimming pool filtration and circulation system for a swimming pool, the system including a skimmer system having a water intake from the pool, a filter for receiving and filtering water intaken by the intake, and a pump for returning filtered water from the filter to the pool, the improvement comprising a chemical treatment device comprising a vessel of synthetic material with a compartment for containing a quantity of treatment chemical, the compartment having a vertical extent for containing such chemical in the form of multiple pieces larger than the openings, the vertical extent having a plurality of the break-opens, each being an extension of the vertical extent, and each providing means for being selectively opened by breaking each said extension for providing corresponding opening which opens from exteriorly of the vessel into the compartment and chemical contained therein, means for positioning the vessel to receive flow of water for causing the flow to enter such opening to cause water of the flow to be exposed to the chemical for dissolving it, the break-opens being arranged in groups at different levels along the vertical extent to permit selective determination of the rate of dissolving the chemical, the pieces being prone to change of shape as the chemical is dissolved and entrained, interior walls of the compartment diverging downwardly to prevent bridging of the chemical within the compartment as the chemical is dissolved, and at least one drain opening into the compartment for discharging treated water therefrom into the skimmer system.

* * * * *